(12) United States Patent
Shimoyama et al.

(10) Patent No.: US 8,564,847 B2
(45) Date of Patent: Oct. 22, 2013

(54) OPERATION DEVICE AND IMAGE READING APPARATUS

(75) Inventors: Noboru Shimoyama, Yokohama (JP); Hiroshi Ogushi, Shiroi (JP); Yasushi Ishida, Tokyo (JP); Yasuhito Tsubakimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 13/074,386

(22) Filed: Mar. 29, 2011

(65) Prior Publication Data

US 2011/0299142 A1 Dec. 8, 2011

(30) Foreign Application Priority Data

Jun. 8, 2010 (JP) ................................ 2010-131251

(51) Int. Cl.
*H04N 1/40* (2006.01)
*H04N 1/04* (2006.01)
*G06F 3/045* (2006.01)
*F21V 7/04* (2006.01)

(52) U.S. Cl.
USPC ........... 358/471; 358/474; 358/400; 345/173; 345/174; 362/209

(58) Field of Classification Search
USPC ........................................................ 362/609
See application file for complete search history.

(56) References Cited

U.S. PATENT DOCUMENTS

| 2007/0152977 | A1* | 7/2007 | Ng et al. ........................ 345/173 |
| 2011/0242571 | A1* | 10/2011 | Ogushi et al. ................. 358/1.13 |
| 2011/0242612 | A1* | 10/2011 | Tsubakimoto et al. ........ 358/442 |
| 2011/0242613 | A1* | 10/2011 | Ishida et al. ................... 358/442 |
| 2011/0299129 | A1* | 12/2011 | Ishida et al. ................... 358/442 |
| 2011/0299134 | A1* | 12/2011 | Shimoyama et al. .......... 358/474 |

FOREIGN PATENT DOCUMENTS

JP 2009-88759 A 4/2009

\* cited by examiner

*Primary Examiner* — Cheukfan Lee
(74) *Attorney, Agent, or Firm* — Canon USA Inc. IP Division

(57) ABSTRACT

A graphic that indicates a switch is formed on a panel at a location corresponding to a first light guide element. A character to be displayed via the panel is formed on a second light guide element. The first light guide element is supported on a substrate, in close contact with an electrode, via a sheet-like shaped attaching member, and the second light guide element is supported by a base material without being supported on the substrate.

9 Claims, 6 Drawing Sheets

OPERATION DEVICE AND IMAGE READING APPARATUS

BACKGROUND OF THE INVENTION

1. Field of the Invention

The present invention generally relates to imaging and, more particularly, to an operation device including a touch switch and an image processing apparatus including the operation device.

2. Description of the Related Art

Japanese Patent Application Laid-Open No. 2009-88759 discusses a multifunction peripheral (MFP) which includes an image reading unit. The device includes a reading unit, which is configured to read an image of a document set on a reading surface, and a pressing plate, which can open on the reading surface. On an upper surface of the pressing plate, an operation unit, which includes a plurality of input keys, and a display device, such as a liquid crystal display (LCD) panel, are provided.

An MFP as discussed in the Japanese Patent Application Laid-Open No. 2009-88759 includes an operation unit having a multiple of switches. Furthermore, the operation unit of the conventional MFP may display its function by using a character (string) together with a graphic to enable the operator to easily recognize the function of the switch.

As various different languages are used in different countries of the world, it is necessary to display the character (string) in the language officially used in the apparatus shipment destination country. However, an apparatus that has been produced to be shipped to one country that uses a specific language may be actually instructed to be shipped, after its assembly, to another country that uses another language different from the specific language of the former shipment destination country.

In this case, it is required to execute an operation for changing the language of the characters to be displayed to a predetermined language by disassembling the operation unit. A method for easily changing the characters to be displayed on the operation unit, which is provided previously to respond to a case where such an operation becomes necessary, is desired by the market.

A mixture of graphics and character strings that indicate the function of the switch of the operation unit are displayed thereon. However, usually, if the language to be used for the display has been changed, it is only necessary to change the characters (character strings). In other words, in this case, character portions to be changed and graphic portions not to be changed may mixedly exist at the same time.

SUMMARY OF THE INVENTION

The present invention is directed to an operation device capable of easily changing a specific graphic (of a character string, a digit string, or other graphics) to be changed only without disassembling a display unit for graphic portions not to be changed.

According to an aspect of the present invention, an operation device includes a cover portion including a panel cover on which a graphic indicating a switch is formed, a first light guide element configured to face the panel cover at a location at which the graphic is formed, a first light source provided corresponding to the first light guide element, a second light guide element on which a specific graphic to be displayed via the panel cover is formed and configured to face the panel cover, a second light source provided corresponding to the second light guide element, an electrode provided at a location corresponding to the first light guide element and configured to detect a capacitance, a substrate on which at least the first light source and the electrode are mounted, and a base member configured to detachably support the second light guide element and to be jointed with the cover portion. In the operation device, the first light guide element is supported on the substrate at a location of the electrode and the second light guide element is supported by the base member without being supported on the substrate.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DESCRIPTION OF THE EMBODIMENTS

Various exemplary embodiments, features, and aspects of the invention will be described in detail below with reference to the drawings.

In the following description, apparatuses that have an image reading unit configured to read an image of a document, such as a scanner, a printer, a facsimile apparatus, a copying machine, or an MFP, will be collectively referred to as an "image reading apparatus".

Figure 1A:
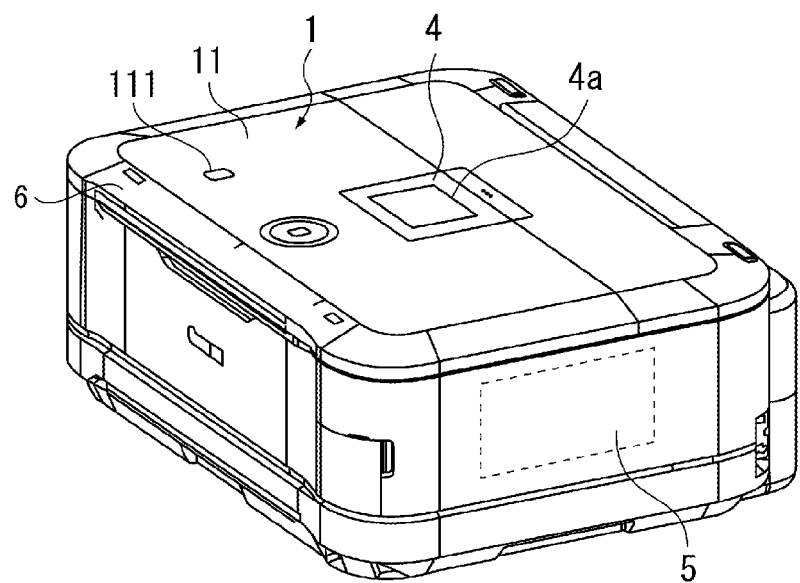
FIGS. 1A and 1B are perspective views illustrating an exemplary configuration of an apparatuses according to an exemplary embodiment of the present invention.
Figure 1B:
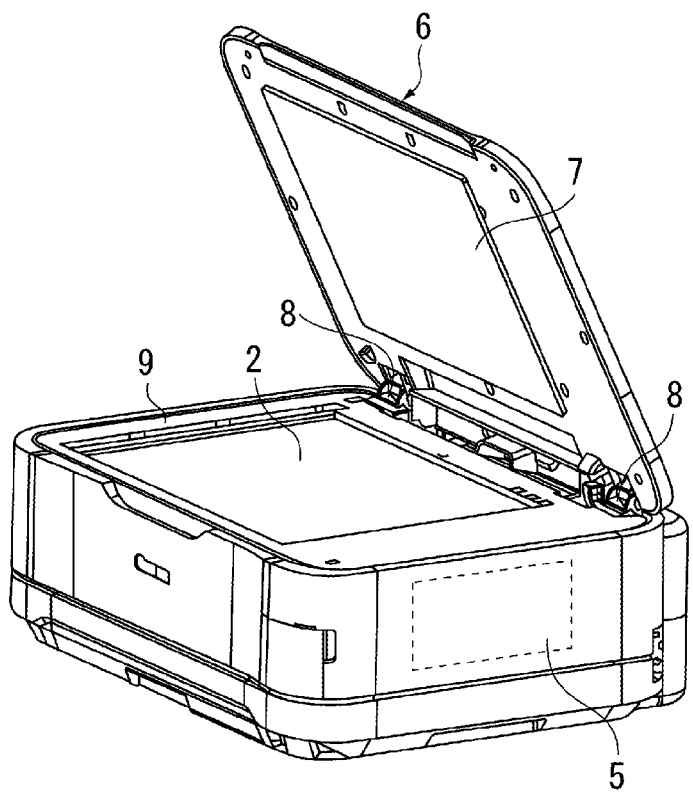

FIGS. 1A and 1B illustrate an exemplary configuration of an image reading apparatus according to an exemplary embodiment of the present invention. FIG. 1A illustrates a state of the image reading apparatus in which a pressing plate thereof is closed while in FIG. 1B, the pressing plate is opened.

The image reading apparatus, within a housing thereof, includes a reading unit having a flatbed scanner, a recording unit, and a control unit 5. The reading unit reads an image of a document set on a reading surface. The recording unit prints a document image read by reading the document on a sheet. The control unit 5 controls an operation of the entire image reading apparatus. The reading unit and the recording unit are implemented by a well-known art, such as the conventional device discussed in Japanese Patent Application Laid-Open No. 2009-88759. Accordingly, the reading unit and the recording unit will not be described in detail in the present specification.

The control unit 5 is constituted by a controller board, which includes a central processing unit (CPU), a memory, and various input/output (I/O) interfaces. A pressing plate 6 is provided at the top portion of the image reading apparatus and can open on a reading surface 2.

After appropriately installing the image reading apparatus to a user (operator)'s environment, the operator can access the image reading apparatus from the left (the front side) of FIGS. 1A and 1B.

Referring to FIG. 1A, the pressing plate 6 is a document positioning plate cover, which presses the document when closed. A panel unit 1 is provided on the upper surface of the pressing plate 6.

The panel unit 1 includes a panel cover 11. On the panel cover 11, a display unit 4 and various operation keys (input switches) are installed closely to one another. In addition, a power button 111 is installed to the panel cover 11. The operation keys are capacitance touch switches except the power button 111.

The capacitance touch switch is a touch switch that detects the capacitance, which varies when the operator touches its touch-operation surface with his/her finger, and recognizes the detected capacitance as an input. The detailed configuration of and an operation executed by the capacitance touch switch will be described in detail below.

The display unit 4 includes a display window 4a, which is constituted by a transparent member. When the display unit 4 is retracted, the display unit 4 is tilted just onto the surface of the panel cover 11, as illustrated in FIG. 1A. The display unit 4 can be pivoted by the operator to be tilted up to become oriented towards the front of the image reading apparatus. In other words, when the display unit 4 is retracted (pivoted down), a display of the display window 4a can be viewed from above. On the other hand, when the display unit 4 is extended (pivoted up), the display of the display window 4a can be viewed from the front.

The power button 111 has a structure of a mechanical contact key, such as a tactile switch. If the operator presses the power button 111 when the image reading apparatus has been powered off, the apparatus is powered on. On the other hand, if the operator presses the power button 111 when the image reading apparatus has been powered on, the apparatus is powered off.

Referring to FIG. 1B, the pressing plate 6 is pivotably mounted to a frame 9 in a back portion (the opposite portion of the front portion thereof) at two locations by using hinges 8. The reading surface 2 is constituted by a transparent glass plate. The operator sets a document on the upper surface of the reading surface 2 in a face-down state (i.e., with the surface of the document to be read facing downwards). The perimeter of the glass plate is covered with a cover to be mounted to the frame 9.

A press-contact sheet 7 is mounted to the inner (back) surface of the pressing plate 6 in order to prevent floating of the document set on the reading surface 2 by applying pressure onto the document. Vertical play is provided to engagement between the hinge 8 and the pressing plate 6. Accordingly, the image reading apparatus can read an image of a thick book document.

The control unit 5 controls various operations executed by the image reading apparatus. More specifically, the control unit 5 controls an operation of each of the reading unit and the recording unit. In addition, the control unit 5 controls the display by the display unit 4, a switch input that is input by an operation on the touch switch, and the display of the touch switch.

As will be described below, the control unit 5 controls a plurality of operation modes of the image reading apparatus. More specifically, the control unit 5 toggles on and off a backlight of the touch switch (i.e., light for illuminating the touch switch from behind) according to each selected operation mode.

Figure 2A:
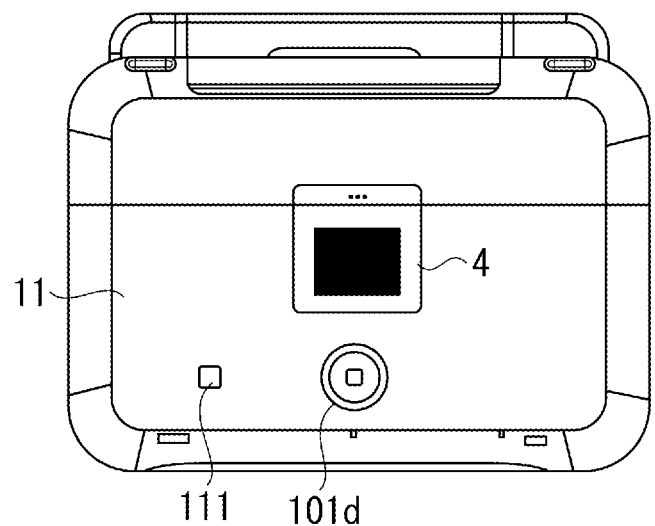
FIGS. 2A and 2B illustrate a state of display on an operation panel in each of power-off and power-on states.
Figure 2B:
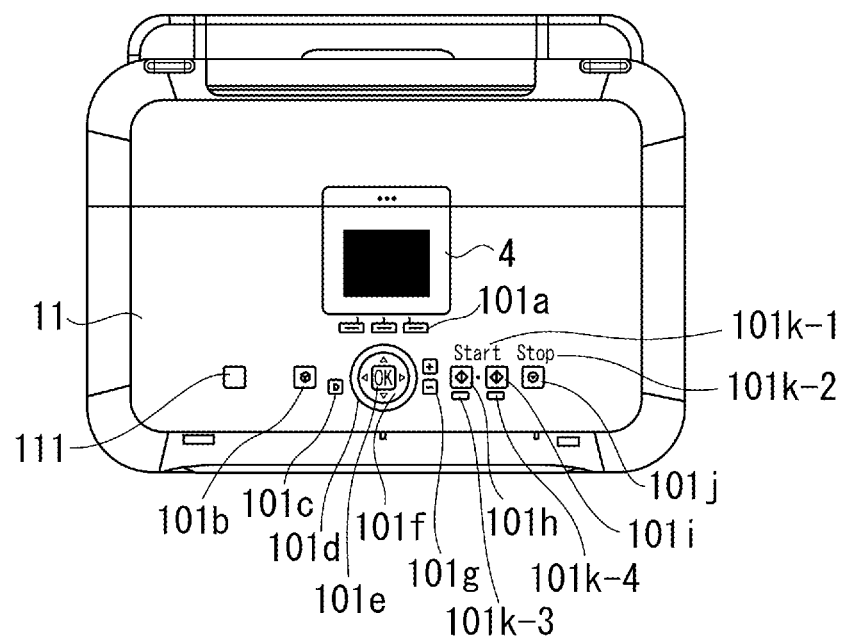

FIGS. 2A and 2B are top views of the image reading apparatus, which illustrate a status of display on an operation panel (operation device) provided to the panel cover 11 on the upper surface of the pressing plate 6.

In the example illustrated in FIG. 2A, the image reading apparatus has been powered off. Various operation keys of an operation unit of the image reading apparatus are out of view of the operator except the power button 111 and a jog wheel 101d.

In the example illustrated in FIG. 2B, the image reading apparatus has been powered on and all the operation keys are displayed in a lit state. When the key is displayed in a lit state, the operator can validly input information via the operation key displayed in the lit state.

In the example illustrated in FIG. 2B, the operation key includes a home key 101b, a return key 101c, which can be operated to a previous state, a monochromatic copy key 101h, a color copy key 101i, and a stop key 101j. The monochromatic copy key 101h is a key for instructing the start of a monochromatic copy operation or a monochromatic image scan operation. The color copy key 101i is a key for instructing the start of a color copy operation or a color image scan operation. The stop key 101j is a key for instructing the discontinuation of the current copy operation or scan operation.

In addition, the operation key includes a function key 101a. The function key 101a is constituted by three keys, which can be operated for selecting a display item displayed on a screen of the display unit 4. Furthermore, the operation key includes four-arrow (four-direction) key 101f and a jog wheel 101d. The four-direction key 101f can be operated to move a cursor up, down, left, or right on the screen displayed on the display unit 4. The jog wheel 101d has a wheel-like shape and can be operated to move the cursor.

The operation key includes an OK key 101e and plus-minus ("+" and "−") keys 101g. The OK key 101e can be operated to finally inputting an operator selection. The plus-minus keys 101g can be operated to set numerical values, such as the number of copies.

Each of the above-described operation keys is a capacitance touch switch, which includes a backlight. The backlight of each operation key can be independently turned on or off. When the backlight is turned on, a graphic (mark), which is uniquely assigned to the corresponding key, is displayed. Accordingly, the operator can easily recognize the operation key. On the other hand, when the backlight of the operation key is turned off, the mark on the key become hardly recognizable for the operator. Note that the meaning of "turned off" contains not only the backlight becoming off completely, but also becoming alight with a weak power.

In addition, four character display portions configured to merely display a character string and having no function as a capacitance touch switch are provided to the panel cover 11. More specifically, a character string "start" is displayed on a character display portion 101k-1, which is located adjacent to and above the monochromatic copy key 101h and the color copy key 101i, to notify the operator that the monochromatic copy key 101h or the color copy key 101i is a functional key for instructing the start of an operation.

A character string "stop" is displayed on a character display portion 101k-2, which is located adjacent to and above the stop key 101j to notify the operator that the stop key 101j is a functional key for instructing the discontinuation of an operation.

A character string "BLACK" is displayed on a character display portion 101k-3, which is located adjacent to and below the monochromatic copy key 101h to notify the operator that the monochromatic copy key 101*h* is a functional key for instructing an operation in a monochromatic mode that uses a black ink only. A character string "COLOR" is displayed on a character display portion 101*k*-4, which is located adjacent to and below the color copy key 101*i* to notify the operator that the color copy key 101*i* is a functional key for instructing an operation in a color mode.

Figure 6A:
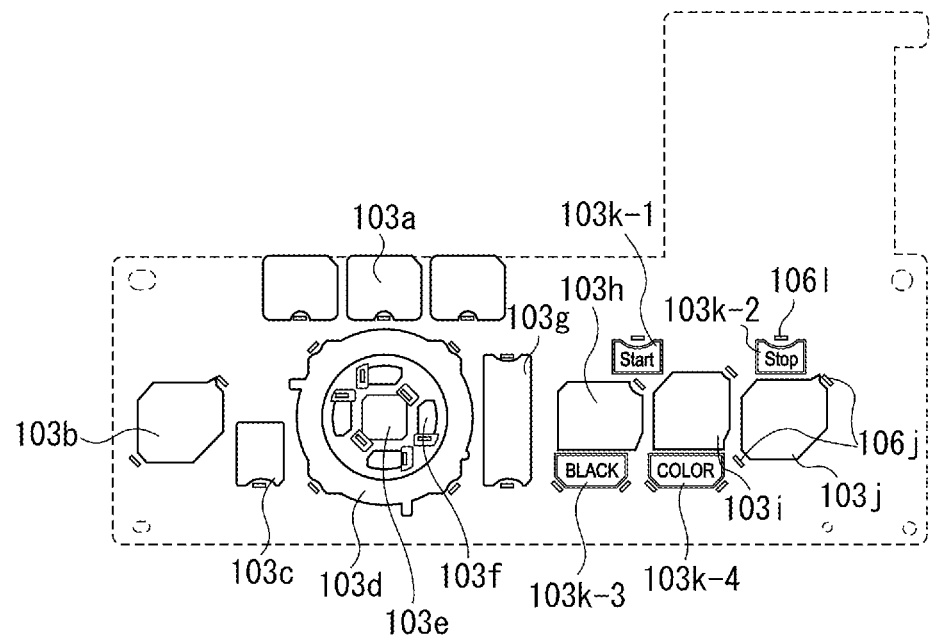
FIGS. 6A and 6B illustrate an exemplary configuration related to changing of a character string to be displayed.

In the present exemplary embodiment, the character strings are displayed in English supposing that the apparatus is to be shipped to countries that officially use English as illustrated in FIG. 6A. On the other hand, if the apparatus is to be shipped to Japan, the display of the character strings is changed to the "katakana" display, such as "sutahto", "sutoppu", "burakku", and "karah", respectively. For other language, the display of the character strings can be appropriately changed. An exemplary method for changing the display of the character strings to be displayed will be described in detail below.

The four character display portions illuminate a character portion formed by the light-transmissive portion from the back thereof. Accordingly, the character strings on the panel cover 11 are made visible as clearly as to be appropriately visually recognized by the operator.

Illumination on each character display portion is controlled to be independently turned on and off to toggle between the character display state and the character non-display state.

Figure 3:
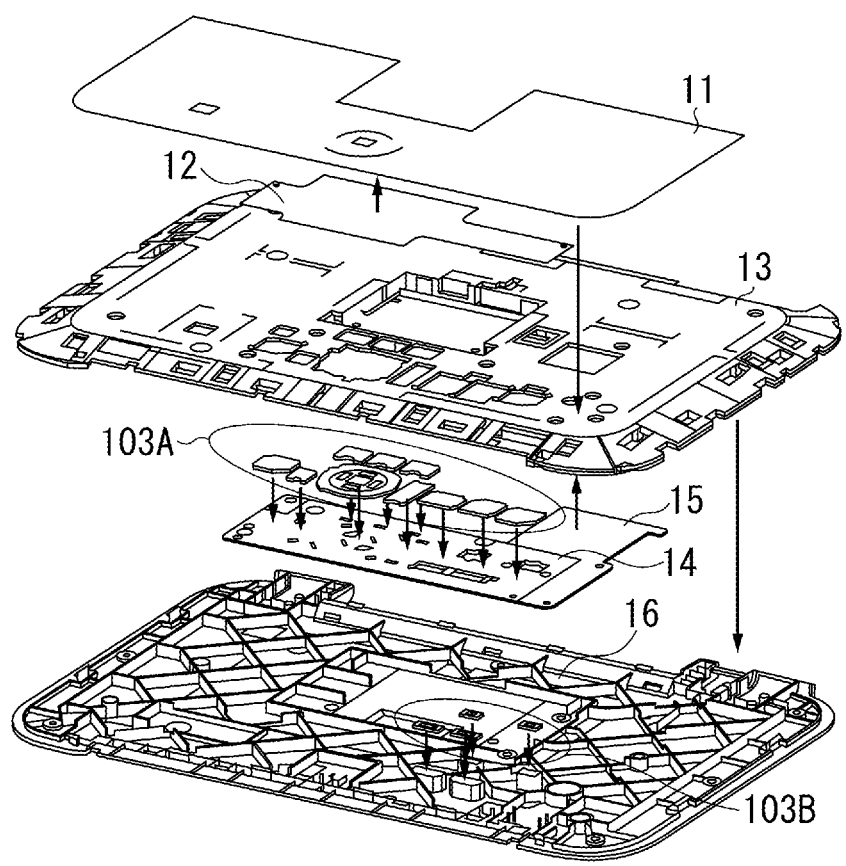
FIG. 3 illustrates an exemplary structure of a panel unit.

FIG. 3 is an exploded perspective view illustrating an exemplary laminated configuration of the panel unit 1. The panel unit 1 has a laminated structure including, in order from the front (top) surface, the panel cover 11, an attaching member 12, a light guide element group 103A (a first light guide element), a light guide element group 103B (a second light guide element), an attaching member 14, a circuit substrate 15, and a base member 16.

The panel unit 1, as a whole, is an integrated structural member, which is closely laminated together by using the attaching member 12 and the attaching member 14.

More specifically, the attaching member 12 (a first attaching member), which is a translucent sheet, is laminated between the panel cover 11 and the light guide element group 103A to closely attach the panel cover 11 and the light guide element group 103A together.

Similarly, the attaching member 14 (a second attaching member), which has a sheet-like shape, is inserted between the light guide element group and the circuit substrate 15 to closely attach the light guide element group and the circuit substrate 15 together. It is not necessary that the attaching member 14 is translucent. Both the attaching members 12 and 14 are made of a nonconductive insulating material.

The panel cover 11 and the base member 16 are engaged together by an engagement unit, such as a screw, at a plurality of locations. Accordingly, the panel cover 11 and the base material 16 are substantially integrally attached to each other.

The panel cover 11 is one board-like shaped member that is light transmissive (transparent or translucent). Furthermore, the panel cover 11 is made of a plastic material, such as acryl, acrylonitrile butadiene styrene (ABS), polycarbonate (PC), methyl methacrylate-butadiene-styrene resin (MBS), or styrenic-block-copolymers (SBC), or a glass material.

The light guide element groups 103A and 103B are also made of a transparent plastic material or a glass material. Each of the attaching members 12 and 14 is one integrated (non-divided) sheet, which is commonly provided to a plurality of electrodes. Because each of the attaching members 12 and 14 is an integrated (non-divided) sheet, it becomes easy to assemble the operation panel.

In assembling the operation panel, the panel cover 11 and the light guide element group 103A should be completely closely attached together by laminating the attaching member 12 between them without any gap or space. This is because if the panel cover 11 and the light guide element group 103A are not completely closely attached together and if any air gap of low conductivity may arise due to the loose attachment between them, variation of the capacitance may not be stably detected. As a result, the reliability of the capacitance touch switch may degrade.

Furthermore, in order to easily exchange the light guide element later or easily execute an operation for disassembling the panel cover 11 for a maintenance operation, the attaching member 12 should be easily removable, even after they are once closely laminated, without any residual bond. In order to achieve the sufficiently close attachment properties and the highly easy removability of the attaching member 12 at the same time, the present exemplary embodiment uses a self-tack elastic sheet for the attaching member 12, which can adhere to the panel cover 11 without using a bond. For the attaching member described above, a gel sheet can be used.

The attaching member 14, which is used for closely attaching the light guide element group 103A and the circuit substrate 15 (the surface of the plurality of electrodes) together, has the same characteristic as that of the attaching member 12. Accordingly, for the attaching member 14, the self-tacking elastic sheet, such as a gel sheet, can be used. It is not always necessary that both the attaching members 12 and 14 are gel sheets. In other words, either one of the attaching members 12 and 14 only can be a gel sheet. In addition, a sheet which is different from a gel sheet and made of a material having the same self-tacking properties and elasticity can be used as the attaching members 12 and 14. Furthermore, a two-sided adhesive tape that cannot be easily damaged when removed, such as a two-sided adhesive tape made by using polyethylene terephthalate (PTE), can be used.

Figure 4:
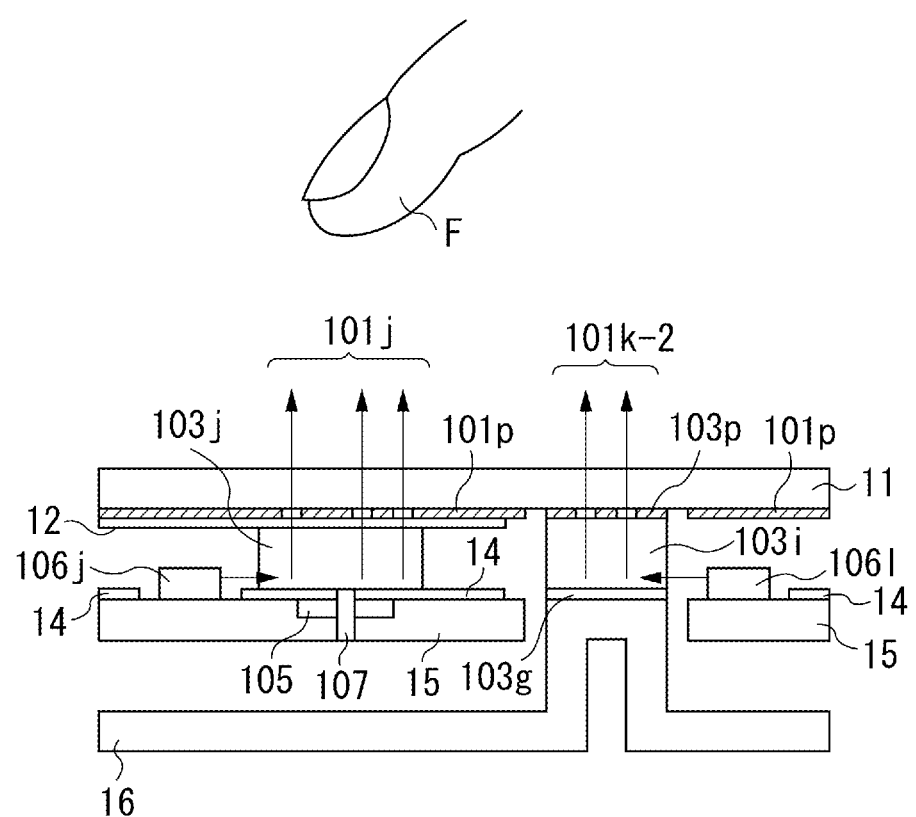
FIG. 4 is a cross section of a capacitance touch switch.

FIG. 4 is cross section of the panel cover 11 at the locations of the stop key 101*j* and the character display portion 101*k*-2. To begin with, an exemplary structure at the location of the stop key 101*j* will be described in detail below.

On the surface of the panel cover 11 on its back side, a light-shielding layer 101*p* is formed by printing that uses a black ink. Immediately below the stop key 101*j*, a transparent graphic portion having a light-transmission portion of a predetermined shape, which is partially not printed by using the black ink, is formed.

Viewed from above, the transparent graphic portion takes a specific graphical shape. In the example illustrated in FIG. 4, the transparent graphic portion takes a shape of a graphic indicating "stop" surrounded by a rectangle as the stop key 101*j* (FIG. 2B).

The panel cover 11 is translucent. Accordingly, if the transparent graphic portion is illuminated with light, by using the backlight including the light source and the light guide element, from behind (from the bottom), the graphical shape of the transparent graphic portion can be recognized by the operator. If the backlight is turned off, the graphical shape of the transparent graphic portion is not illuminated with light (i.e., turns completely dark to become less recognizable). Therefore, in this state, the operator cannot recognize the graphical shape of the transparent graphic portion.

As a result of an experiment conducted by the inventors, by using the panel cover 11 made of a translucent gray-smoke material, it became very difficult for the operator to visually recognize the transparent graphic portion when the backlight had been turned off. In this state, the graphical shape of the transparent graphic portion was actually invisible for the operator. Accordingly, the contrast between the graphical display on-state and the graphical display off-state became more intense.

The panel cover 11 is constituted by one integrated board-like member. Accordingly, if the backlight is turned off, the switches except the power button 111, the jog wheel 101*d*, and the OK key 101*e* become less recognizable. Accordingly, in this state, the operator would not be annoyed at which switch to operate. In addition, in this state, the beauty of the image reading apparatus can be increased.

A light source 106*j*, which emits light to be incident to a light guide element 103*j* via a side thereof, is implemented on the circuit substrate 15. The light source 106*j* is a semiconductor light source, such as a light-emitting diode (LED) or an organic light emitting diode (OLED).

In the present exemplary embodiment, the light is emitted from the light source 106*j* in a direction horizontal to the surface of the operation panel and in a direction of incidence of light to the light guide element 103*j* via the side of the light guide element 103*j*.

When the light source 106*j* is turned on, a diffused light flux is incident to the light guide element 103*j*. The diffused light flux that has been incident to the light guide element 103*j* is repeatedly reflected within the light guide element 103*j* to be further transmitted.

On the bottom surface of the light guide element 103*j*, a diffusion surface is formed by applying white coating thereon. After being incident on the diffusion surface, the light is diffusion-reflected and a part thereof is diffused upwards (in a direction indicated by an arrow).

A part of the diffusion-reflected light is externally emitted out of the transparent graphic portion. The other part of the light is shielded by the light-shielding layer 101*p*. Accordingly, the illuminated portion can be visually recognized by the operator. As described above, the backlight is constituted by the light source and the light guide element.

At a location of the circuit substrate 15 immediately below a position for touching the surface of the panel cover 11 with the fingertip F, one electrode 105 is installed, which is used for detecting the state of switching of the stop key 101*j*. In addition, a signal processing circuit (including a processor), which is electrically connected to each electrode, is installed on the circuit substrate 15.

The signal processing circuit converts the variation of the capacitance, which is detected at the electrode, into digital data. Furthermore, the signal processing circuit executes signal processing to determine the status of switching (whether the operator has touched the panel cover 11 on the touching surface thereof by using parameter values "on" and "off".

When the operator touches the panel cover 11, the region of the panel cover 11 touched by the operator by the fingertip F and the electrode 105 function as a kind of a capacitor together. Accordingly, when the operator touches the surface of the panel cover 11 with his fingertip F, the capacitance varies. The signal processing circuit determines whether the panel cover 11 has been touched by the operator according to a result of detection of the variation of the capacitance by using the electrode 105.

If an input via the touch switch has been previously enabled, the signal processing circuit determines that a switch input has been executed (that the switch has been set "on") if the capacitance detected by the electrode has exceeded a predetermined threshold value. On the other hand, if an input via the touch switch has been previously disabled, the signal processing circuit discards the capacitance detected by using the electrode or raises the above-described predetermined threshold value.

A through hole 107 is formed on the circuit substrate 15 at the location of the electrode 105. The air is released from the through hole 107 when attaching the light guide element group 103A and the circuit substrate 15 together by using the attaching member 14 on a large area. Accordingly, an air gap cannot easily arise between the attaching member 14 and the surface of the electrode.

As described above, the present exemplary embodiment employs the gel sheet having high close-attachment properties as the elastic sheet 14. In addition, the present exemplary embodiment provides the through-hole to the circuit substrate 15. Due to a synergetic effect of these effects, no air gap can easily arise during assembly of the operation panel. It is not necessary that the through hole 107 is provided all through the electrode 105 from the upper surface to the bottom thereof. In other words, the through hole 107 can be located near the electrode 105.

Now, an exemplary configuration at the location of the character display portion 101*k*-2 will be described in detail below. Immediately below the character display portion 101*k*-2, no circuit substrate 15 is provided but a light guide element 103*k*-2 is supported by the base member 16.

More specifically, a through hole is formed on the circuit substrate 15 and the light guide element 103*k*-2 is supported on a protrusion of the base member 16 via the through hole.

Figure 5A:
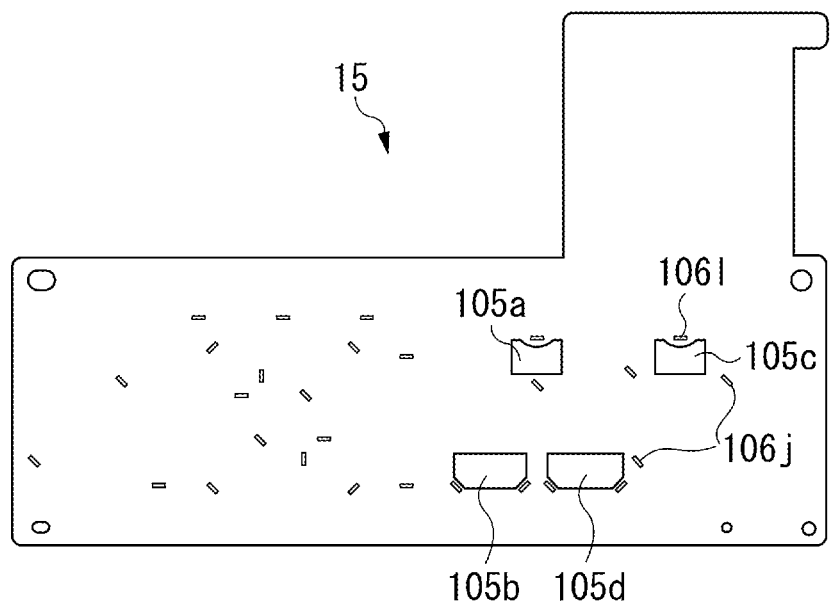
FIGS. 5A and 5B illustrate an exemplary state of a circuit substrate during assembly thereof.

As illustrated in FIG. 5A, four through holes 105*a* through 105*d* are formed on the circuit substrate 15 at four different locations thereon. The light guide element 103*k*-2 is closely attached onto the protrusion of the base member 16 via an attaching member 103*q*, which is an adhesive sheet.

More specifically, the attaching member 103*q* has an adhesive force merely sufficient for the attaching member 103*q* to be easily removed when exchanging the attaching member 103*q* later.

A light guide element 103*l* has a surface that is a light-shielding layer 103*p*. A character string "Stop" is displayed on the light-shielding layer 103*p* via the light-transmissive portion. Immediately below the character display portion 101*k*-2, the sheet-like shaped attaching member 12 is discontinued as a hole.

The character display portion 101*k*-2 merely displays a character but does not have a function as a capacitance touch switch. Accordingly, it is not necessary for the character display portion 101*k*-2 to closely contact the panel cover 11 without any air gap. Therefore, it is enough for the light guide element 103*k*-2 to be adjacent to the back surface of the panel cover 11 in a manner slightly contacting or not contacting the panel cover 11.

In order to cause light to be incident to the light guide element 103*k*-2 from the side thereof and to illuminate the character string on the light-transmissive portion from behind, a light source 106*l* is implemented on the circuit substrate 15. The light source 106*l* is a semiconductor light source, such as an LED or an OLED, as the light source 106*j*.

When light is emitted from the light source 106*l*, the light is incident to the light guide element 103*k*-2 via the side thereof. Then, the incident light is diffused on the diffusion surface formed on the bottom surface of the light guide element 103*k*-2. In this manner, the character string on the light-transmissive portion formed on the upper surface of the light guide element 103*k*-2 is illuminated with the light from behind. Accordingly, the character string is displayed on the panel cover 11 in a manner visually recognizable by the operator.

As described above, the panel cover 11 is made of a translucent gray-smoke material. Therefore, if the backlight is turned off, the character string may become almost visually unrecognizable (i.e., becomes substantially invisible.

All of the plurality of light guide elements 103a through 103j that illuminates the switching unit with light, including the light guide element 103j, are supported by the circuit substrate 15. Furthermore, for not only the character display portion 101k-2 but also the other character display portions 103k-1, 103k-3, and 103k-4, the corresponding light guide element (i.e., each of the light guide elements 103k-1 through 103k-4) has the same configuration described above and is supported by the base member 16.

In the following description, the plurality of light guide elements 103a through 103j, each of which illustrates the corresponding switch, is collectively referred to as a "first light guide element" while the plurality of light guide elements 103k-1 through 103k-4 of the character display portion is collectively referred to as a "second light guide element".

As described above, the first light guide element, which illuminates the switch portion with light, is supported directly on the circuit substrate 15 while the second light guide element, which illuminates the portion other than the switch portion (i.e., the character display portion), is not supported directly on the circuit substrate 15 but is supported by the base member 16 independently from the circuit substrate 15.

Furthermore, on the circuit substrate 15, all of the plurality of light sources that illuminates the first light guide element with light (the first light source) and the plurality of light sources that illuminates the second light guide element with light (the second light source), and the plurality of electrodes configured to detect the capacitance are mounted. Accordingly, the entire electric system can be integrally implemented on one substrate. Therefore, the number of necessary electric cables can be effectively reduced. Accordingly, the circuit substrate 15 can be implemented at a high density.

The light source that illuminates the second light guide element with light (i.e., the light source 106j) can be mounted on another substrate different from the circuit substrate 15.

Now, an exemplary method for assembling and disassembling the panel unit 1 will be described in detail below with reference to FIGS. 3 and 4.

In assembling the panel unit 1, a worker executes the following operations. To begin with, the worker keeps ready the circuit substrate 15, on which the electrodes, the light sources, circuits, and parts have already been correctly mounted. FIG. 5A is a top view of the ready circuit substrate 15.

Subsequently, the worker attaches the attaching member 14 onto the circuit substrate 15 at a predetermined location. Then, the worker mounts the light guide element group 103A (the first light guide element) on the attaching member 14 at predetermined locations. The worker further presses the light guide element group 103A from above in this state to closely attach the light guide element group 103A with the circuit substrate 15. In the above-described manner, each of the plurality of electrodes and the bottom surface of each corresponding light guide element are closely attached to each other without any air gap.

Figure 5B:
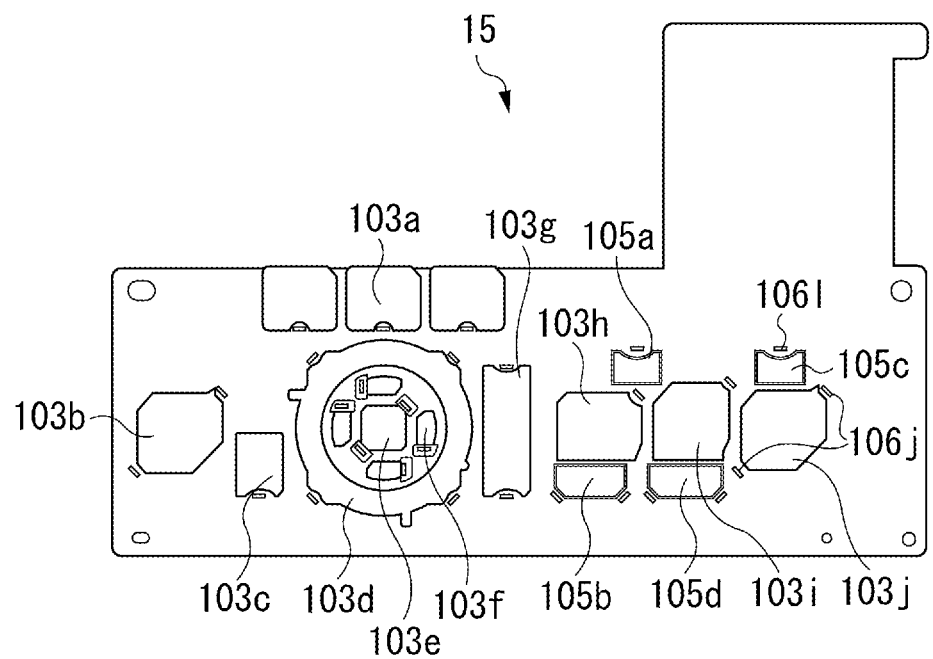

FIG. 5B is a top view of the circuit substrate 15 after the light guide element group 103A (the light guide elements 103a through 103j) has been mounted. Subsequently, the worker mounts the circuit substrate 15, which has the light guide elements now mounted thereon, onto a cover portion 13.

More specifically, at this stage of the assembling operation, a part of the cover portion 13 on the back surface thereof closely contacts apart of the surface of the attaching member 14. In the above-described manner, the attaching member 14 and the cover portion 13 are attached together.

A plurality of through holes has been formed on the cover portion 13. Each through hole corresponds to each first light guide element arranged on the circuit substrate 15. When the circuit substrate 15 is mounted onto the cover portion 13, the upper surface portion of each light guide element is inserted into the through hole to be engaged therewith.

The thickness of the cover portion 13 has been previously set so that the upper surface of each light guide element and the surface of the cover portion 13 exist on the same plane (i.e., have the same height from the bottom surface of the circuit substrate 15.

On the other hand, the worker separately keeps ready the base member 16 and the light guide element group 103B. It is supposed that the character string in a selected language has been previously formed. The worker sets the second light guide element at four protrusions of the base member 16 via the attaching member 103q. Then, the worker presses the second light guide element downwards to closely attach the second light guide element onto the base member 16.

Then, the worker joints a resulting part including the cover portion 13 and the circuit substrate 15 with the base member 16 assembled in the above-described manner, respectively. In jointing the resulting part including the cover portion 13 and the circuit substrate 15 with the base member 16, the worker can joint them by a jointing method by which the assembled panel unit 1 can be disassembled later without damaging the same during disassembly thereof, such as a method that uses screws at a plurality of locations, by a snap-fit method, or a bonding method that uses a two-sided adhesive tape FIG. 6A is a top view of a resulting part including the mutually jointed cover portion 13 and base member 16. The light guide elements 103k-1 through 103k-4, which are supported by the base member, are inserted into the four through holes 105a through 105d, respectively, formed on the circuit substrate 15 and are engaged therewith.

In addition, through holes for engagement at the light guide elements 103k-1 through 103k-4 are provided on the cover portion 13. Accordingly, when the cover portion 13 is viewed from above, the characters formed on the upper surface of the light guide element can be read via the through holes, as illustrated in FIG. 6A.

Finally, the worker attaches the panel cover 11 onto the cover portion 13 at a predetermined location thereof via the attaching member 12, in a state in which the cover portion 13 and the base member 16 have been attached together. In the above-described manner, the panel unit 1 can be completely assembled. The completely assembled panel unit 1 is then mounted onto the upper surface of the pressing plate 6 together with the display unit 4.

After the panel unit 1 has been assembled, it may become necessary to change the character string to be displayed on the character display portion due to a change in the destination of shipment or the change in the display content. In this case, the worker executes the following operations.

At first, the worker removes and takes out the panel unit 1 from the pressing plate 6. Subsequently, the worker releases the joint between the cover portion 13 and the base member 16 of the removed panel unit 1 at the joint portions to separate the cover portion 13 from the base member 16.

At this stage of disassembly operation, the panel cover 11 including the light guide element group 103A (the first light guide element) and the panel cover 11 remain assembled on the cover portion 13. On the other hand, the light guide element group 103B (the second light guide element) remains assembled on and supported by the base member 16.

More specifically, because the second light guide element is supported by the base member 16 independently from the circuit substrate 15, the second light guide element accompanies the cover portion 13 while being supported by the base member 16.

The worker then removes the light guide element group 103B, which has been supported by the base member 16 via the attaching member 103q, to replace the same with the second light guide element having the display of the desired character indicated in the desired language. Then, the worker joints the cover portion 13 and the base member 16 together and assembles the resulting part including the cover portion 13 and the base member 16 again to the panel unit 1.

As described above, if it is desired to change the character string on the character display portion, the present exemplary embodiment can allow the worker to easily change the character portion only without having to disassemble the display unit and the capacitance touch switch provided to the graphic portion mounted on the cover portion 13, which is not to be changed.

Figure 6B:
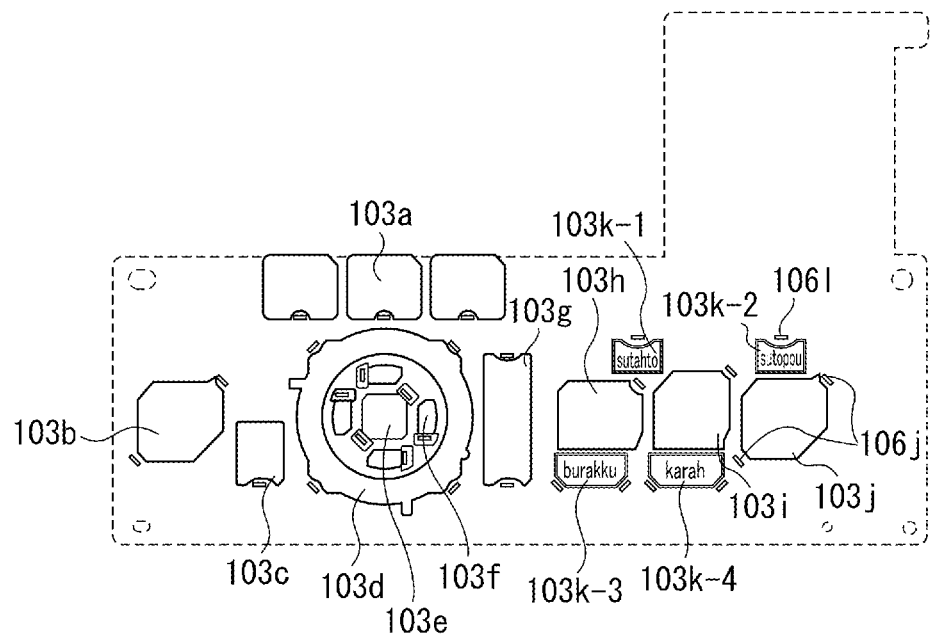

FIG. 6B illustrates an example of a state in which the character strings are replaced with those displayed in Japanese. If the content of the character string to be displayed, the worker should only exchange the corresponding second light guide element similarly to the case of changing the language to be used for displaying the character string.

Suppose that the light guide element group 103B is directly supported by and on the circuit substrate 15 similar to the light guide element group 103A, the worker may need to disassemble the cover portion 13 in order to exchange the light guide element group 103B used for displaying the character string. More specifically, in this case, the worker should remove the panel cover 11 from the cover portion 13 and then remove the circuit substrate 15 from the cover portion 13.

In removing the panel cover 11 and the circuit substrate 15 from the cover portion 13, the worker should apply a great amount of force. Accordingly, the circuit substrate 15, on which sensitive and fragile electronic parts have been mounted, may be damaged.

Because the panel cover 11 and the light guide element group 103A are attached together via the attaching member 12, a peeling mark may remain on the panel cover 11 or the light guide element group 103A after the disassembly. In this case, it is necessary to discard the panel cover or the light guide element group 103A having the adhesive peeling mark or to reutilize the same after completely cleaning the peeling mark off the panel cover 11 or the light guide element group 103A.

With the above-described configuration, the exemplary embodiment of the present invention can solve the above-described problem.

As described above, according to the exemplary embodiment of the present invention described above, if the worker desires to change the character string to be displayed on the operation device, the worker is enabled to easily change the character to be displayed only without having to disassemble the graphic display unit, which is not to be changed. Accordingly, the worker is enabled to surely execute the operation within short time.

The present invention is not limited to the exemplary embodiment implemented in the case where the character string is exchanged to a character string indicated in another different desired language. More specifically, the present invention can be implemented in a case where a specific graphic (a character string, a digit string, or other graphics) is to be exchanged. The specific graphic can be formed on the second light guide element.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-131251 filed Jun. 8, 2010, which is hereby incorporated by reference herein in its entirety.

What is claimed is:

1. An operation device comprising:
a cover portion including a panel cover on which a graphic indicating a switch is formed;
a first light guide element configured to face the panel cover at a location at which the graphic is formed;
a first light source provided corresponding to the first light guide element;
a second light guide element on which a specific graphic to be displayed via the panel cover is formed and configured to face the panel cover;
a second light source provided corresponding to the second light guide element;
an electrode provided at a location corresponding to the first light guide element and configured to detect a capacitance;
a substrate on which at least the first light source and the electrode are mounted; and
a base member configured to detachably support the second light guide element and to be jointed with the cover portion,
wherein the first light guide element is supported on the substrate at a location of the electrode and the second light guide element is supported by the base member without being supported on the substrate.

2. The operation device according to claim 1, wherein a through hole is formed on the substrate, and
wherein the second light guide element is supported by the base member via the through hole.

3. The operation device according to claim 1, wherein the second light guide element is attached to the base member by using an attaching member, and
wherein the light guide element and the panel cover are not attached to each other.

4. The operation device according to claim 1, wherein the specific graphic is indicated by a character of a predetermined language.

5. The operation device according to claim 1, wherein the panel cover and the first light guide element closely contact each other with a first attaching sheet having translucency and non-conductivity, and
wherein the first light guide element and the electrode closely contact each other with a second attaching sheet having non-conductivity.

6. The operation device according to claim 5, wherein the first attaching sheet is a self-tacking gel sheet.

7. The operation device according to claim 5, wherein a through hole is formed on the substrate at a location adjacent to the electrode.

8. The operation device according to claim 1, wherein the panel cover is made of a translucent gray-smoke material.

9. An image reading apparatus comprising:
a reading unit configured to read a document set on a reading surface;
a pressing plate capable of opening relative to the reading surface; and
the operation device according to claim 1, which is provided on an upper surface of the pressing plate.

* * * * *